(12) United States Patent
Li et al.

(10) Patent No.: US 10,289,626 B2
(45) Date of Patent: May 14, 2019

(54) DISTRIBUTED SEQUENTIAL PATTERN MINING (SPM) USING STATIC TASK DISTRIBUTION STRATEGY

(71) Applicants: Teradata US, Inc., Dayton, OH (US); Qian Zhang, Fengtai District (CN)

(72) Inventors: Tao Li, Changping District (CN); Lijun Zhao, Haidian District (CN); Yu Wang, Haidian District (CN); Wenjie Wu, Shijingshan District (CN); Qian Zhang, Fengtai District (CN); Shaoming Li, Chaoyang District (CN)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 14/898,755

(22) PCT Filed: Dec. 30, 2014

(86) PCT No.: PCT/CN2014/095531
§ 371 (c)(1),
(2) Date: Dec. 16, 2015

(87) PCT Pub. No.: WO2016/106549
PCT Pub. Date: Jul. 7, 2016

(65) Prior Publication Data
US 2017/0308584 A1    Oct. 26, 2017

(51) Int. Cl.
*G06F 17/30*      (2006.01)
*G06F 16/2458*    (2019.01)
(Continued)

(52) U.S. Cl.
CPC .......... *G06F 16/2465* (2019.01); *G06F 16/00* (2019.01); *G06F 16/24549* (2019.01); *G06F 2216/03* (2013.01)

(58) Field of Classification Search
CPC ......... G06F 17/30474; G06F 17/30539; G06F 17/30545
See application file for complete search history.

(56) References Cited

U.S. PATENT DOCUMENTS 8,332,857 B1 * 12/2012 Brown .............. G06F 17/30463
707/718
2007/0143759 A1 * 6/2007 Ozgur ................... G06F 9/5033
718/102
(Continued)

FOREIGN PATENT DOCUMENTS

CN    101739337 A    6/2010

OTHER PUBLICATIONS

"International Application Serial No. PCT/CN2014/095531, International Search Report dated Sep. 18, 2015", 4 pgs.
(Continued)

*Primary Examiner* — Alicia M Willoughby
(74) *Attorney, Agent, or Firm* — Schwegman, Lundberg & Woessner, P.A.

(57) ABSTRACT

Seed patterns are derived from a sequence database. Execution costs for types of seed patterns are computed. Each seed pattern is iteratively distributed to distributed nodes along with that seed pattern's assigned execution cost. The distributed nodes processing in parallel to mine the sequence database for super patterns found in the sequence database. When a distributed node exhausts its execution budget, any remaining mining needed for the seed pattern being mined is reallocated to another distributed node having remaining execution budget.

9 Claims, 8 Drawing Sheets

(51) Int. Cl.
    *G06F 16/00*         (2019.01)
    *G06F 16/2453*    (2019.01)

(56) References Cited

U.S. PATENT DOCUMENTS

| | | | |
|---|---|---|---|
| 2010/0095162 A1* | 4/2010 | Inakoshi | G06F 11/3409 |
| | | | 714/45 |
| 2010/0179955 A1* | 7/2010 | Wu | G06F 17/30539 |
| | | | 707/748 |
| 2011/0302157 A1* | 12/2011 | Li | G06F 17/30654 |
| | | | 707/723 |
| 2012/0278346 A1* | 11/2012 | Han | G06F 17/30306 |
| | | | 707/758 |
| 2014/0215477 A1* | 7/2014 | Chen | G06F 9/5066 |
| | | | 718/102 |
| 2017/0109207 A1* | 4/2017 | Li | G06F 17/30 |
| 2017/0161337 A1* | 6/2017 | Yao | G06F 17/3053 |

OTHER PUBLICATIONS

"International Application Serial No. PCT/CN2014/095531, Written Opinion dated Sep. 18, 2015", 5 pgs.

Liu, "Sequential Pattern Mining Algorithm Based on Map Reduce", Computer Engineering, No. 15, vol. 38, (Aug. 5, 2012), 3 pgs.

* cited by examiner

| UserId | SID | Sequence |
|--------|-----|----------|
| 1 | 10 | <a(abc)(ac)d(cf)> |
| 1 | 20 | <(ad)c(bc)(ae)> |
| 1 | 30 | <(ef)(ab)(df)cb> |
| 1 | 40 | <eg(af)cbc> |

FIG. 2

DISTRIBUTED SEQUENTIAL PATTERN MINING (SPM) USING STATIC TASK DISTRIBUTION STRATEGY

RELATED APPLICATIONS

This application is a U.S. National Stage Application under 35 U.S.C. § 371 of International Application No. PCT/CN2014/095531, filed Dec. 30, 2014, which application is hereby incorporated by reference in its entirety.

TECHNICAL FIELD

The present invention relates to a method for processing a distributed SPM technique.

BACKGROUND OF THE INVENTION

Sequential Pattern Mining (SPM) is a type of data mining that is concerned with finding statistically relevant patterns between data values where the values are delivered in a sequence.

SPM is widely used in applications, such as: click stream analysis, shopping list analysis, calling pattern analysis in telecom, and gene sequence analysis. Several algorithms, such as the Generalized Sequential Pattern (GSP) algorithm and the PrefixSpan algorithm, which were created from various research efforts to solve this important problem. However, although various algorithms have been proposed and great progress has been achieved within the last decade, the algorithm complexity is still very high. For example, assuming that in a given website there are 100 kinds of webpages and the average length of a session is 10 minutes, the number of possible patterns could be $100^{10}$.

Considering processor and memory limitations of a single computer, a more efficient approach to SPM is needed in the industry.

SUMMARY OF THE INVENTION

In various embodiments, techniques and a system for distributed Sequential Pattern Mining (SPM) using a static task distribution strategy are presented. According to an embodiment, a method for processing a distributed SPM technique is provided.

Specifically, (a) seed patterns from a sequence database are generated. Next, (b) an execution budget for processing each seed pattern based on a length for that seed pattern is generated. Then, (c) a number of the seed patterns with those seed patterns' execution budgets is distributed to distributed nodes that are enabled to process in parallel with one another. Next, (d) the execution of the distributed nodes while the distributed nodes process the distributed seed patterns based on the distributed execution budgets are load balanced. Finally, the processing (c)-(d) is iterated until each seed pattern is processed to identify super patterns derived from the sequence database.

BRIEF DESCRIPTION OF THE DRAWINGS

FIG. 2 is a diagram of a table depicting a sample sequence database, according to an example embodiment.

DETAILED DESCRIPTION

Figure 1:
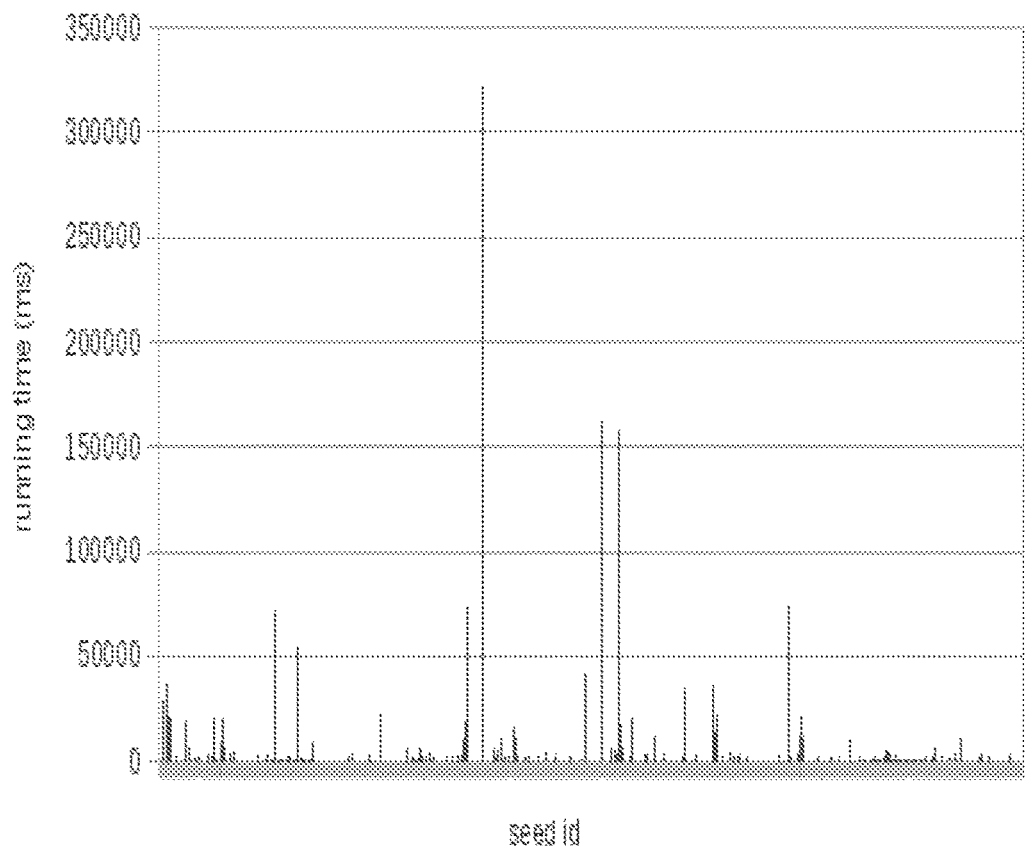
FIG. 1 is a diagram depicting the distribution of time cost to mining super patterns for a set of seed patterns, according to an example embodiment.

It is to be noted that the techniques presented herein are implemented as executable instructions that are programmed in memory or non-transitory computer-readable storage media (or medium) for execution on one or more processing devices, each processing device having one or more processors, and each processor specifically configured to execute the executable instructions.

The techniques and system herein propose a new and novel approach for memory, storage, and processor efficient generation, representation, storage, and usage of processing a distributed SPM technique.

Task distribution is the key point in developing a parallel SPM algorithm. An idea parallel SPM algorithm can distribute the work load evenly to each node. Currently there are some parallel implementations of SPM algorithms but all of them are based on a Message Passing Interface (MPI) framework where the tasks (seed prefixes) are dynamically distributed among all nodes during the mining process (which means a node can request new tasks dynamically when it finishes the tasks that were previously assigned). However, under Map/Reduce framework it is difficult for one node to communicate with other nodes during the execution of a map or reduce job. So, a static task distribution strategy can be used, which means the tasks are distributed before the execution of a map/reduce job and cannot be reassigned during the job execution.

The techniques and system presented herein teach a novel parallel SPM algorithm, which adopts a static task distribution strategy, so it is suitable for platforms based on Map/Reduce framework. First, an accurate measure of the relative execution time for mining all the super patterns of a given seed pattern is determined. This measure is used with a selective sampling technique to estimate the required time to process a seed pattern using approximately only 5% of the time cost associated with actually processing the SPM algorithm. With the workload estimation resolved, a budget target is set for each node in a parallel processing architecture. Once a given node consumes its allotted budget, the unprocessed seed patterns are redistributed and queued into a next round of processing. In this way, a relatively evenly distributed running time is ensured for each node on each round of processing.

A Frequent Paths function is a Structured Query Language (SQL)-Map Reduce (MR) function for SPM, which is enhanced herein and below with the discussed techniques and system.

Furthermore, the proposed SPM logic is extremely scalable. It allows data scientists to dig for patterns with little overhead, such that they can find new and interesting rules, which are strong in some special scenarios but not so frequent overall.

Usually conventional SPM algorithms resort to an a priori rule to reduce the search space, for example: if a sequence is a frequent pattern then all its subsequences must be frequent patterns also, and conversely if a sequence is not a frequent pattern then all its super sequences must not be frequent. For example, if pattern "<(a)>" is not frequent, then "<(a)(b)>" must also not be frequent. So, most conventional SPM algorithms adopt a pattern growth mechanism to discover all the frequent patterns by: finding all the length-1 patterns and then using those length-1 patterns as seeds to find all length-2 patterns, and then continuing the process until no more patterns are found. To develop a parallel SPM algorithm, a possible approach is to distribute a set of seed patterns among all nodes, where each node just discovers the super patterns for the seeds assigned to it. However, the issue is the time for discovering all the super patterns for different seeds can vary substantially.

FIG. 1 is a diagram of depicting the distribution of time cost to mining super patterns for a set of seed patterns, according to an example embodiment. As shown in the FIG. 1, although most seeds can be processed within 10 seconds, it is noted that the longest processed seed costs near 350 seconds to finish. That means some nodes may take a long period of time to complete while other nodes finish processing in a relatively short period time. So, one issue for designing a parallel SPM algorithm is how to ensure workload balancing among the nodes in a parallel processing architecture.

A sequence consists of a list of ordered item sets where each item set may contain more than one item. As in the example of FIG. 2, a sequence is enclosed by angle brackets, where each item is indicated by a character. If there is more than one item in one item set, those items are enclosed by brackets.

So, given sequence $\alpha$ and $\beta$ such that a is a subsequence of $\beta$, i.e., $\alpha \sqsubseteq \beta$. A subsequence $\beta'$ is called a projection of $\beta$ w.r.t. prefix $\alpha$ if and only if (1) $\beta'$ has prefix $\alpha$ and (2) there exists no proper super-sequence $\beta''$ such that $\beta''$ is a subsequence of $\beta$ and also has prefix $\alpha$. For example, the projection of sequence <a(abc)(ac)d(cf)> w.r.t. prefix <a(abc)> is <(ac)d(cf)>. Given a sequence database D and a prefix $\alpha$, the collection of all the projections of sequences in D w.r.t. a construct the projected sequence database (in short PSD) of $\alpha$, which is denoted as PD($\alpha$).

The novel SPM algorithm presented herein executes in an iterative way. First, a set of seed patterns is generated using a pattern growth procedure, and those seed patterns are evenly distributed among all the computation nodes. On each node, the PrefixSpan algorithm is adopted to generate all the super patterns of each given seed. So, the problem is how to ensure that all the nodes can finish in an expected time period on each round. By predicting the time needed to process a seed, a budget can be set for the expected running time expected on each node, and each node will complete its current iteration when its budget is exhausted.

Considering different hardware configurations that can existing in any parallel processing architecture and the possibility of multiple jobs running concurrently, it's difficult to use the absolute running time as the budget value for scheduling the SPM tasks. So, a measurement that can measure the relative running time for mining all super patterns given a length-n seed pattern is determined. Given a length-n seed pattern s, and assuming $Z(s)=\{z|s \sqsubseteq z$ and support(s)>$\theta$} ($\theta$ is the support threshold), a measure is defined as CSS (Children patterns Support Sum) as:

$$CSS(s) = \sum_{z \in Z(s)} \text{support}(z)$$

Figure 3:
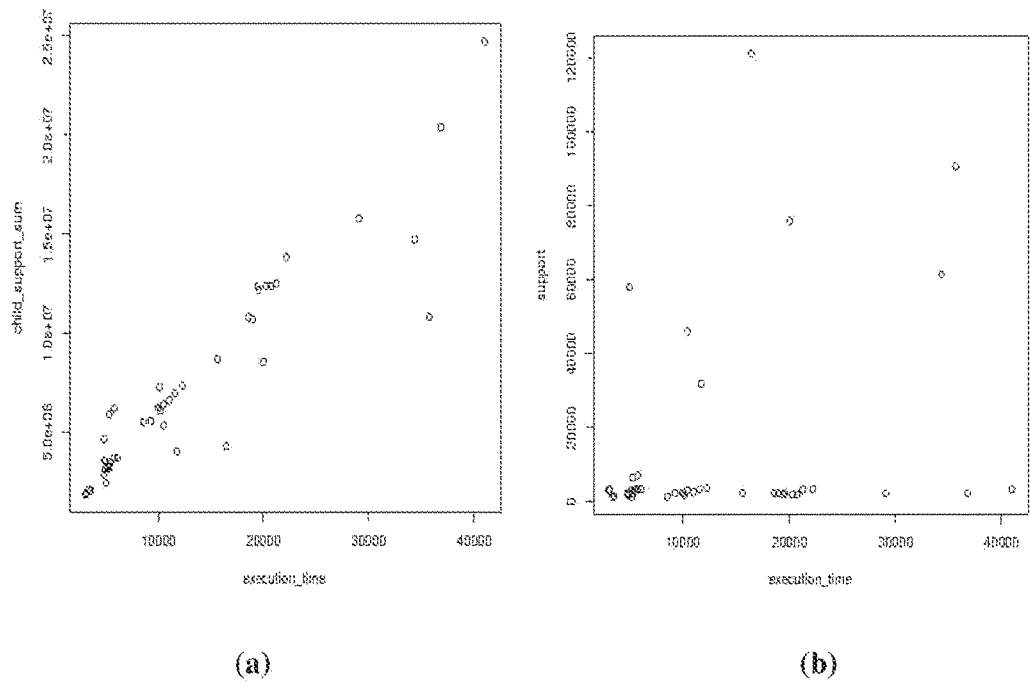
FIG. 3 is a diagram depicting a comparison of using CSS (Children patterns Support Sum) value and support value for measurement of the processing time for a seed pattern, according to an example embodiment.

The measure CSS is defined as the sum of the support value of all the super pattern of s. FIG. 3 (the left picture (a)) shows that the measure CSS is actually a good indicator of the relative running time to process a seed pattern s, where we give out the relationship between the CSS value and processing time for a list of seed patterns. For comparison, the relationship of the support value and processing time are shown for the same list of seed patterns on the right side of the FIG. 3 (b). It can be observed that the CSS value grows linear with the execution time; however the support value significantly varies as the processing time grows.

A second issue is how to predict the running time for a length-n seed pattern without actually processing it. Here, a selective sampling approach is used.

First, discards all infrequent 1-sequences and then discards the last 1 frequent 1-sequences of each sequence. The number 1 is computed by multiplying a given fraction t by the average length of the sequences in the dataset.

The selective sampling method can take about 1~5% of the mining time but still provides an accurate estimation on the relative processing time for the complete dataset. So, by combining selective sampling method and above CSS measure, the following procedure is used to estimate the relative processing time for a given length-n seed pattern s.

So, a procedure for estimating the relative processing time for a given seed pattern, in an embodiment, appears as follows:

Input: a list of seed pattern $S=\{s_1, s_2, \ldots, s_n\}$, each has a projected sequence database $PD(s_i)$; a support threshold $\theta$;
Step 1: for each $s_i$;
  a) Sample on $PD(s_i)$ using selective sampling method to get a sample database $SPD(s_i)$;
  b) Do sequential pattern mining on $SPD(s_i)$ using threshold $\theta$ to get CSS value on $s_i$;
Step 2: As the seed patterns are distributed among N computer nodes, for each node $N_i$, compute $$CSS(N_i) = \sum_{s_i \in N_i} CSS(s_i)$$

That is $CSS(N_i)$ is the sum of CSS values on all the seed patterns in node $N_i$;
Step 3: The median of the value $CSS(N_i)$ will be taken as the budget b for next round processing.

The workflow of the SPM algorithm is now presented. The algorithm runs in an iterative way. First, a set of seed patterns is generated using a pattern growth procedure, and those seed patterns will evenly distribute among all the computation nodes. On each node, a procedure of PrefixSpan algorithm is adopted to generate all the super patterns of each given seed. To achieve workload balance, a budget value is set to all the nodes and each node will stop working once the budget is exhausted. So, there are two possible cases when a node stops processing: one is all the seed patterns are processed and the other is the node stops because the budget is exhausted. In the latter case, the patterns at the leaf nodes of the prefix tree (which are the patterns still possibly having super patterns) are taken as the seed patterns for the next round.

Figure 4:
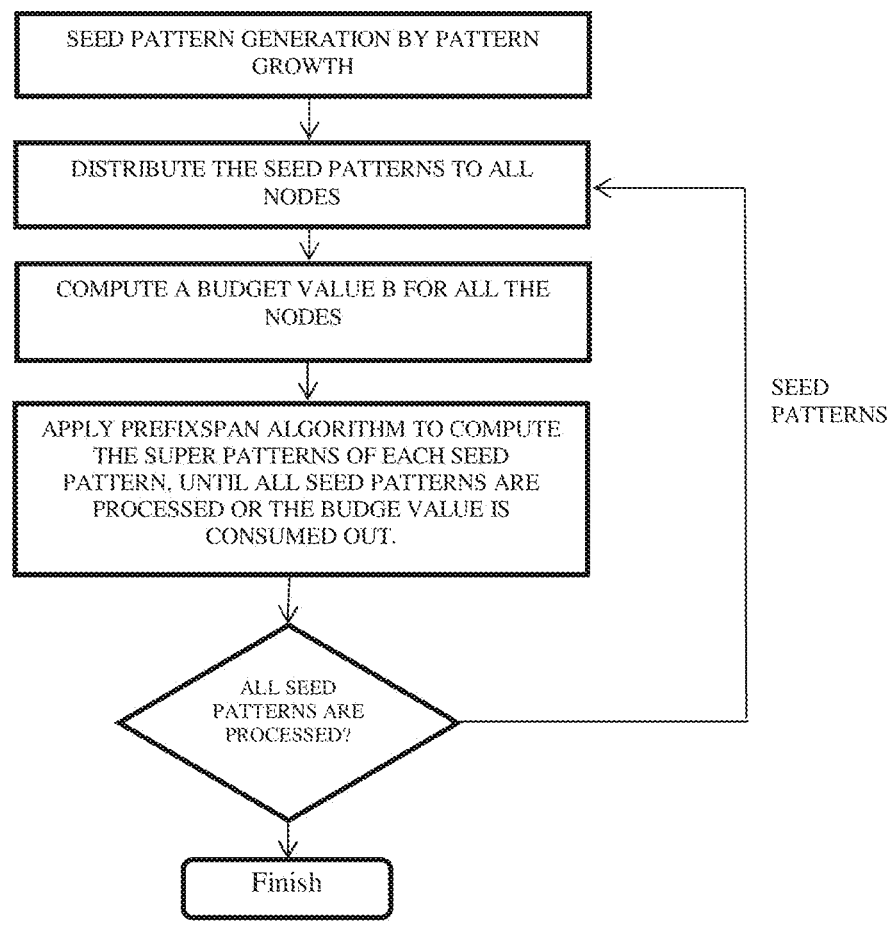
FIG. 4 is a diagram depicting the workflow of the SPM algorithm, according to an example embodiment.

FIG. 4 is a diagram depicting the workflow of the SPM algorithm, according to an example embodiment.

Generating Seed Patterns

A growth procedure is applied to generate initial seed patterns. First, all the frequent 1-sequences are computed during a first scan of the whole sequence database, and then the database is scanned a second time to construct the projected sequence database of a given frequent 1-sequence and get the frequent 2-sequences.

In an embodiment, the technique can be implemented using a map-reduce process: on the map step the support of each candidate frequent n-sequence on a part of the sequence database is counted and on the reduce step the support values for a given candidate are summarized and a determination is made as to whether it is frequent. Just the frequent 2-sequences are used as seed patterns, but it is easy to understand that this procedure can be generated to get frequent n-sequences and those n-sequences can be as seed patterns.

Distributing Seed Patterns to all Nodes

The seed patterns in a fact table are stored and the hash value of the seed pattern is used as the distribution key. In this way, a seed pattern will be stored on a selected node according to the hash value.

Computing Budget Value

The Procedure presented above for estimating the relative processing time for a given seed pattern is used to compute the budget value and the budget value is broadcast to all the nodes at the next PrefixSpan processing step.

PrefixSpan Processing Step

The inputs include a set of seed patterns and the budge value b. It is assumed that each node has a copy of the sequence database. To reduce the volume of data storage and transportation, the projected sequence database of each seed pattern is not kept, rather the projected sequence database of each seed pattern is rebuilt through scanning the sequence database once at the beginning of the PrefixSpan processing step, which is implemented by matching each sequence to a given seed pattern and returning the position of the last matched item. Because the budge value is computed on the sampling Projected Sequence Database (PSD), to control the PrefixSpan process using that budget, the sampling PSD is rebuilt by a same selective sampling procedure. So, for a seed pattern $s_i$, a projected sequence database $PD(s_i)$ is needed and a sampling projected sequence database $SPD(s_i)$.

Figure 5:
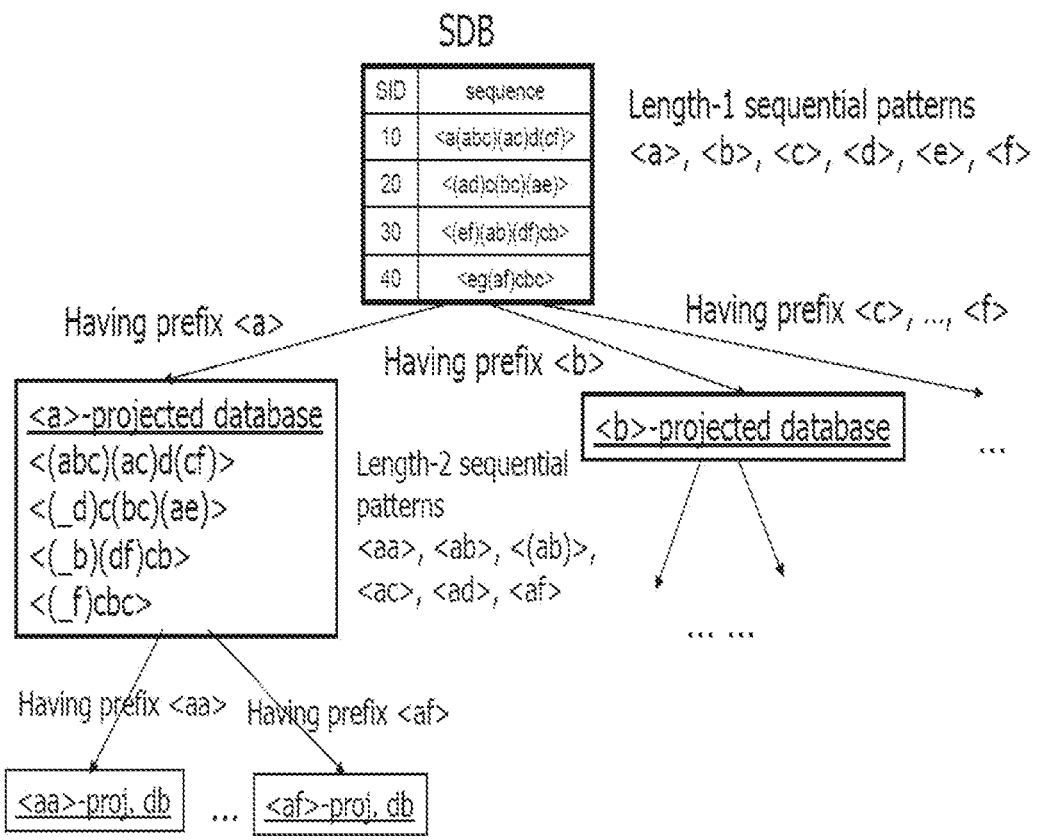
FIG. 5 is a diagram of an example illustration for the PrefixSpan processing, according to an example embodiment.

FIG. 5 is a diagram of an example illustration for the PrefixSpan processing, according to an example embodiment.

Given a seed pattern <a>, and a corresponding projected sequence database PD(<a>), scan PD(<a>) once to get frequent 2-sequences, such as <aa>, <ab>, . . . , <af>, and PD(<aa>), PD(<ab>), . . . , PD(<af>) accordingly. PD(<aa>) can be scanned to get frequent 3-sequences, such as <aaa>, <aab>, etc. This procedure continues until no frequent (n+1)-sequences can be found. This algorithm is efficient because it limits the search scope in the projected sequence database of $s_i$ when we find the super patterns of $s_i$.

Because there are two PSDs, $PD(s_i)$ and $SPD(s_i)$, mining patterns in both PSDs has to take place; the former one is for finding the output patterns and the latter one is for process control. The mining process is to be stopped once the budget is exhausted. However, the two mining processes can be combined into one. Assume one sequence is <(A)(A)(B)(C)(A)(C)(D)(C)(F)(D)(B)>, and the frequent items including (A), (B) and (C). Thus, before PrefixSpan is processed, remove all the non-frequent items in the sequence. So, the sequence becomes <(A)(A)(B)(C)(A)(C)(C)(B)>. After selective sampling, the sequence becomes <(A)(A)(B)(C)(A)> where the last 3 items are removed. The sequence is denoted as <(A)(A)(B)(C)(A)(C)(C)(B)>, where the whole sequence is one record in $PD(s_i)$ and only the bold portion belongs to $SPD(s_i)$. So, just $PD(s_i)$ is used but there are two counters one recording the support of a given candidate in $PD(s_i)$ and the other counter recording the support in $SPD(s_i)$.

There are two possible strategies when the prefix tree is expanded, one is breadth first and the other is depth first. The depth first strategy is chosen first, which can save memory (because less PSDs need to be stored in memory) and this is also more efficient for rebuilding the PSDs for seed patterns at the next round (because the seed pattern number will be less than breadth first strategy).

Listed below is the logic for the PrefixSpan processing step. In this procedure, the input seed patterns are sorted according to its CSS value on the sampling Super Pattern Detection (SPD), which can be obtained during the "computing budget value" step. So, in the next step the seed patterns are processed first with smaller CSS values on the sampling SPD. Because the super pattern number of a given seed pattern is proportional to its CSS value on the sampling SPD, the seeds with fewer super patterns are processed first and those seeds with more super patterns are processed later. This is done to reduce the number of seed patterns for a next round of processing and at the time when the budget is exhausted. The logic for the PrefixSpan processing step appears as follows:

Input: a list of seed pattern $S=\{s_1, s_2 \ldots, s_n\}$, each has a projected sequence database $PD(s_i)$, and the CSS value on the sampling SPD $CSS_{SPD}(s_i)$ which can be gotten in the "computing budget value" step; a support threshold $\theta$; a budget value b;

Sort the seed patterns in S in ascending order according to their CSS values on the sampling PDS, so we get a sequence $\{s_1', s_2', \ldots, s_n'\}$ where $CSS_{SPD}(s_i')<CSS_{SPD}(s_{i+1}')$; for i=n . . . 1:

Push $s_i'$ into a sequence stack Q;
while Q is not empty:
s=Pop(Q);
Assuming the length of s is n, scan PD(s) to get length n+1 patterns $s^1, s^2, \ldots, s^k$, and the support value $support_{SPD}(s^i)$ of each pattern $s^i$ on the sampling database SPD(s).

$$b=b-\Sigma_{i=1}^{k} support_{SPD}(s^i)$$

If b<0, output all the remained patterns in Q as seed patterns for next round, break; Otherwise, push $s^i$ (i=1 . . . k) into stack Q;

The techniques presented herein provided a variety of advantages. They can be deployed in a variety of platforms such as a Map/Reduce framework. The techniques achieve a good workload balance, as it evenly distributes the load to each node even in cases where few patterns dominate the whole processing. Moreover, when the techniques herein are compared with dynamic task distribution strategies, the techniques herein do not need communication between nodes during the map processing so it is uniquely suitable for Map/Reduce implementations. Furthermore, the Frequent Paths function presented herein can achieve processing throughput speeds that are up to 15 times what has been achievable in the past. Additionally, the techniques can be migrated for mining frequent patterns for any application that desires to associate data.

Figure 6:
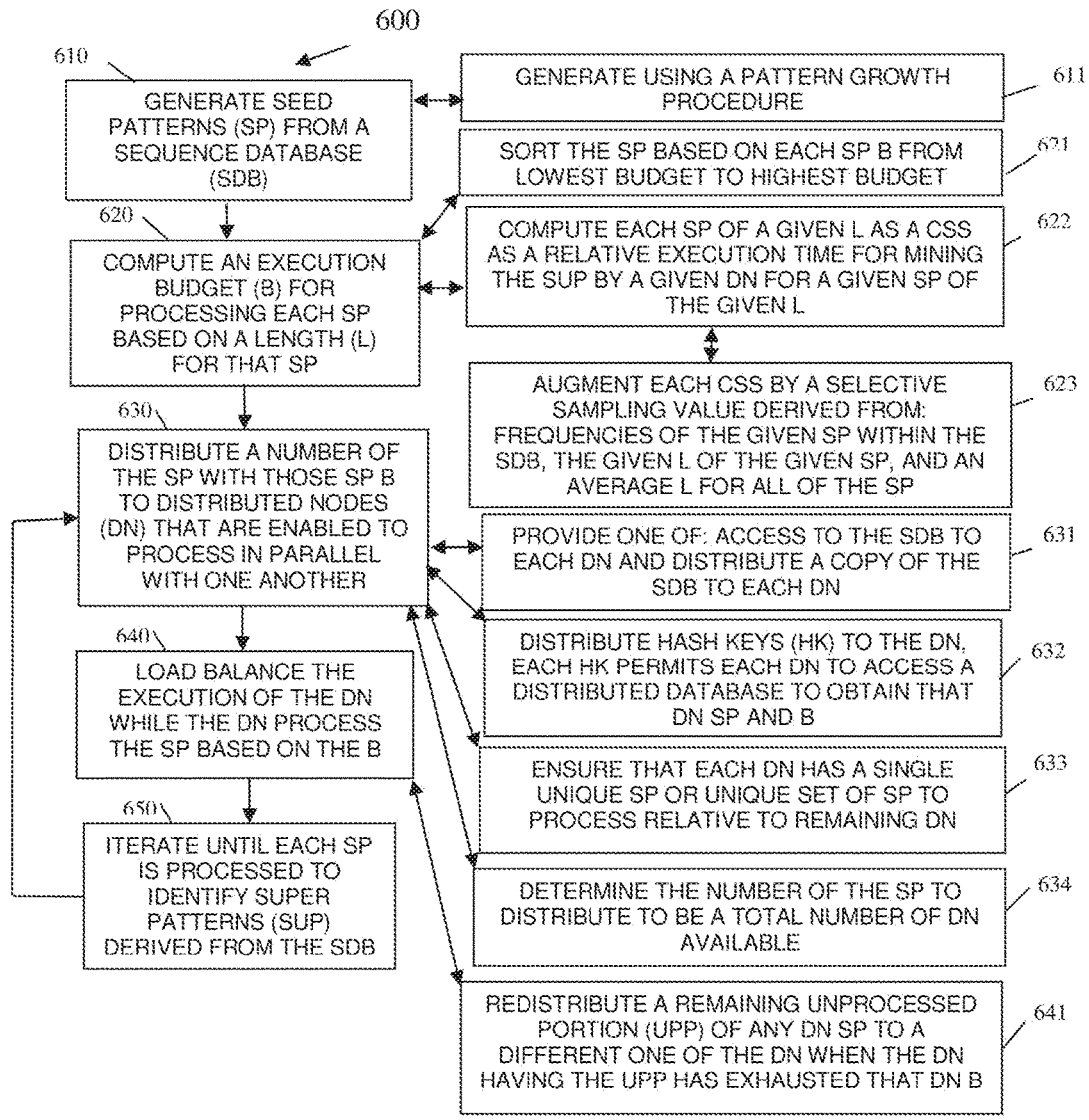
FIG. 6 is a diagram of a method for processing a distributed SPM technique, according to an example embodiment.
Figure 7:
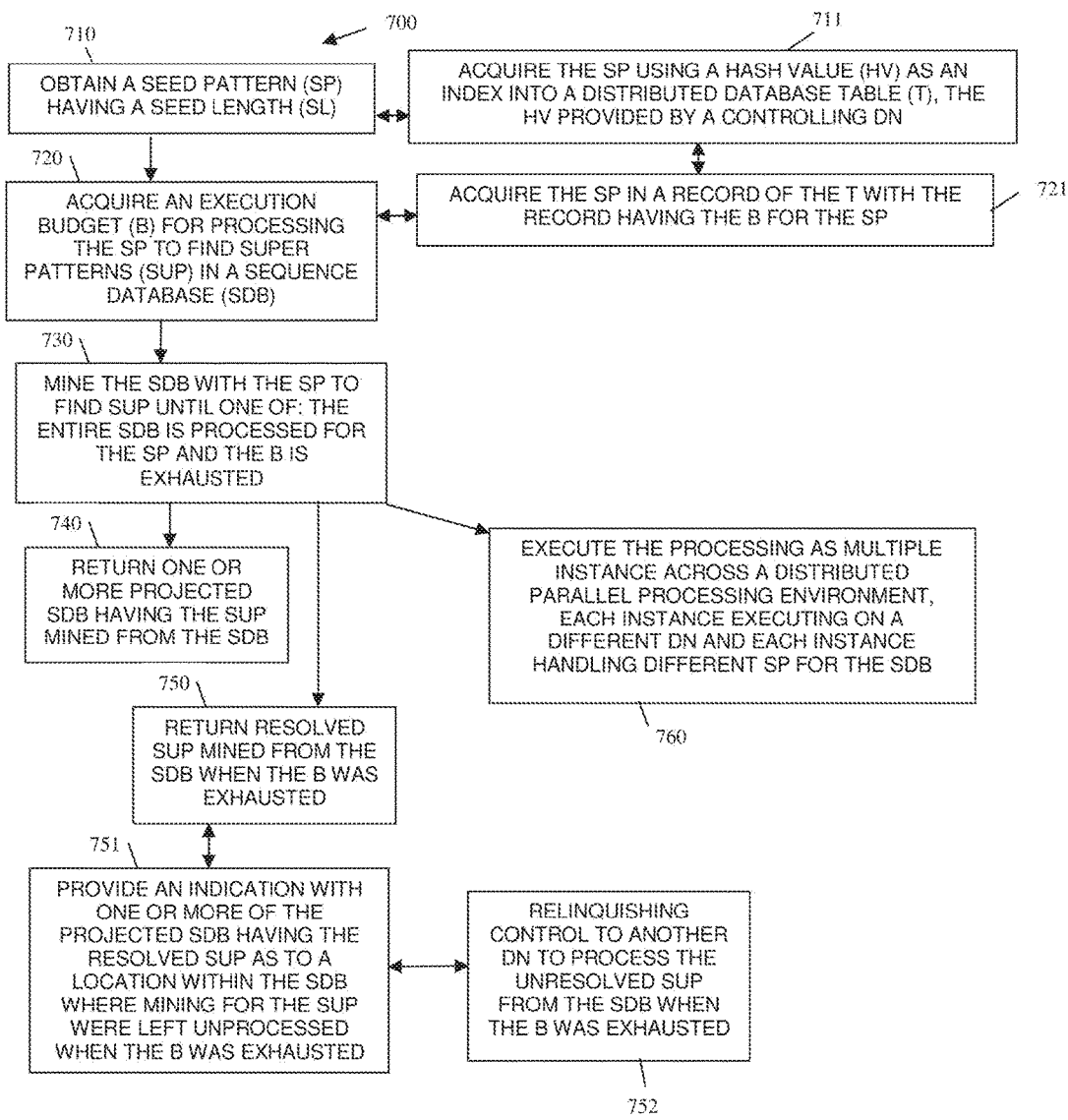
FIG. 7 is a diagram of another method for processing a distributed SPM technique, according to an example embodiment.
Figure 8:
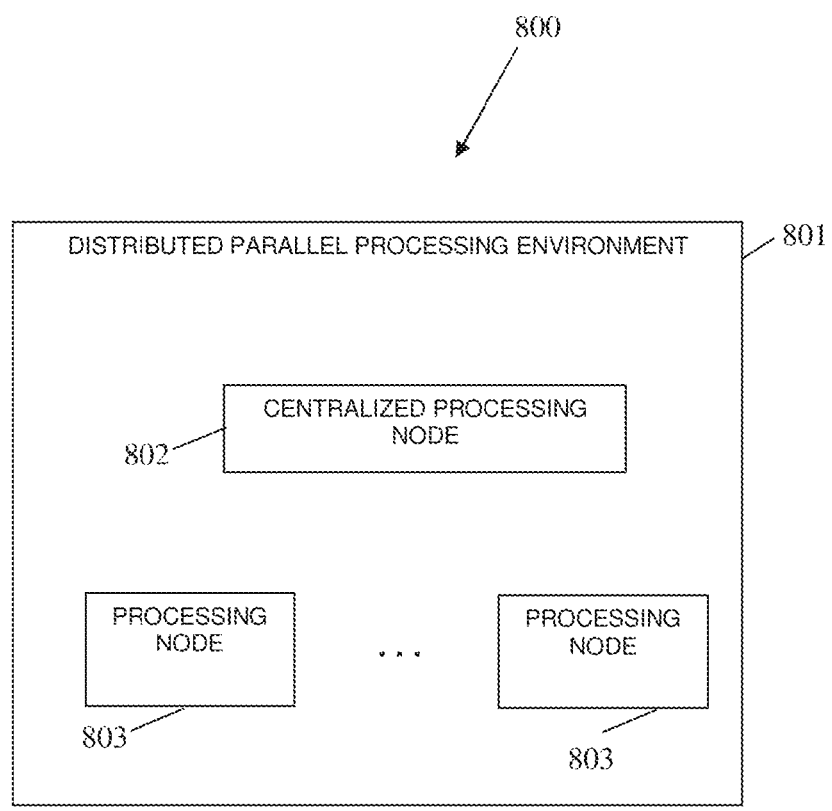
FIG. 8 is a diagram of a distributed SPM system, according to an example embodiment.

These embodiments and other embodiments are presented with the discussion of the FIGS. 6-8.

FIG. 6 is a diagram of a method for processing a distributed SPM technique, according to an example embodiment. The method 600 (hereinafter "pattern miner controller") is implemented as executable instructions that are programmed and reside within memory and/or non-transitory computer-readable storage media for execution on one or more processing nodes (processors) of a network; the network wired, wireless, and/or a combination of wired and wireless.

The processor that executes the pattern miner controller is part of a distributed parallel processing environment and architecture.

In an embodiment, the distributed parallel processing environment is a massively parallel distributed Relational Database Management System (RDBMS).

In an embodiment, the distributed parallel processing environment is part of a Map/Reduce architecture and processing environment.

In an embodiment, the pattern miner controller implements, inter alia, some of the processing discussed above with respect to the FIGS. 1-5.

At 610, the pattern miner controller generates seed patterns from a sequence database. This can be done in the manners discussed above with respect to the FIGS. 1-5.

For example, at 611, the pattern miner controller generates the seed patterns from the sequence database using a pattern growth procedure.

At 620, the pattern miner controller computes an execution budget for each seed pattern based on a length for that seed pattern. That is, the lengths of seed patterns are at least one factor to consider when computing the execution budget for each seed pattern.

According to an embodiment, at 621, the pattern miner controller sorts the seed patterns based on each seed pattern's execution budget. The sort occurs from lowest to highest budget. The benefits of this were discussed above with reference to the FIGS. 1-5.

In an embodiment, at 622, the pattern miner controller computes each seed pattern of a given length as a CSS and as a relative execution time for mining the super patterns by a given distributed processing node for a given seed pattern of the given length.

In an embodiment of 622 and at 623, the pattern miner controller augments each CSS by a selective sampling value derived from: frequencies of the given seed pattern within the sequence database, the given length of the given seed pattern, and an average length for all the seed patterns. A particular computation for the CSS and the selective sampling was discussed in detail above with reference to the FIGS. 1-5.

At 630, the pattern miner controller distributes a number of the seed patterns with those seed patterns' execution budgets to distributed processing nodes. The distributed processing nodes are enabled to process in parallel with one another.

In an embodiment, at 631, the pattern miner controller provides one of: access to the sequence database to each of the distributed processing nodes and/or distributes a copy of the sequence database to each distributed node.

In an embodiment, at 632, the pattern miner controller distributes hash keys to the distributed nodes. Each hash key permits each distributed processing node to access a distributed database to obtain that distributed processing node's seed pattern and execution budget.

In an embodiment, at 633, the pattern miner controller ensures that each distributed processing node has a single unique seed pattern or a unique set of seed patterns to process relative to the remaining distributed processing nodes.

In an embodiment, at 634, the pattern miner controller determines the number of the seed patterns to be a total number of distributed processing nodes available.

At 640, the pattern miner controller load balances the execution of the distributed processing nodes with respect to them processing their seed patterns while the distributed processing nodes process their seed patterns against the sequence database.

In an embodiment, at 641, the pattern miner controller redistributes a remaining unprocessed portion of any distributed processing node's seed pattern to a different one of the distributed nodes when the distributed node having the unprocessed portion has exhausted that distributed processing node's execution budget and when the different distributed processing node has remaining execution budget.

At 650, the pattern miner controller iterates back to 630 until each seed pattern is processed to identify all super patterns derived from the sequence database.

FIG. 7 is a diagram of another method 700 for processing a distributed SPM technique, according to an example embodiment. The method 700 (hereinafter "super pattern mining thread") is implemented as executable instructions within memory and/or non-transitory computer-readable storage media that execute on one or more processors of a distributed processing node, the processors specifically configured to execute the super pattern mining thread. The super pattern mining thread is also operational over a network; the network is wired, wireless, or a combination of wired and wireless.

The distributed processing node is part of a distributed parallel distributed processing environment and architecture.

In an embodiment, the distributed parallel processing environment is a massively parallel distributed RDBMS.

In an embodiment, the distributed parallel processing environment is part of a Map/Reduce architecture and processing environment.

In an embodiment, the super pattern mining thread implements, inter alia, some of the processing discussed above with respect to the FIGS. 1-5.

The super pattern mining thread processes seed patterns distributed by the pattern miner controller of the FIG. 6.

At 710, the super pattern mining thread obtains a seed pattern having a seed length. In an embodiment, the seed pattern is obtained from the pattern miner controller of the FIG. 6.

According to an embodiment, at 711, the super pattern mining thread acquires the seed pattern using a hash value as an index into a distributed database table, the hash value provided by a controlling distributed processing node, such as the pattern mine controller of the FIG. 6. So, the seed pattern need not be delivered directly, instead a hash value can be provided such that the super pattern mining thread can obtain the seed value that it is to process against a sequence database to find super patterns.

At 720, the super pattern mining thread acquires an execution budget for processing the seed pattern to find the super patterns in the sequence database.

In an embodiment of 711 and 720, the super pattern mining thread acquires the seed pattern in a record of the distributed database table with the record having the execution budget for the seed pattern.

At 730, the super pattern mining thread mines the sequence database with the seed pattern to find the super patterns until one of two conditions occur: the entire sequence database is processed for the seed pattern or the execution budget is exhausted for the super pattern mining thread.

In an embodiment, at 740, the super pattern mining thread returns one or more projected sequence databases having the super patterns mined from the sequence database.

In an embodiment, at 750, the super pattern mining thread returns resolved super patterns mined from the sequence database when the execution budget was exhausted.

In an embodiment of 750 and at 751, the super pattern mining thread provides an indication with one or more of the projected sequence databases having the resolved super patterns as to a location within the sequence database where mining for the super patterns were left unprocessed when the execution budget was exhausted.

In an embodiment of 751 and at 752, the super pattern mining thread relinquishes control to another distributed processing node to process the unresolved super patterns from the sequence database when the execution budget was exhausted by the super pattern mining thread.

According to an embodiment, at 760, the super pattern mining thread is executed as multiple instances across a distributed parallel processing environment. Each instance executing on a different distributed processing node and each instance handling or processing different seed patterns for the sequence database.

FIG. 8 is a diagram of a distributed SPM system 800, according to an example embodiment. Some components of the distributed SPM system 800 are implemented as executable instructions that are programmed and reside within memory and/or non-transitory computer-readable storage medium that execute on processing nodes of a network. The network is wired, wireless, or a combination of wired and wireless.

In an embodiment, distributed SPM system 800 implements, inter alia, the techniques presented above with respect to the discussions relevant to the FIGS. 1-5.

In an embodiment, the distributed SPM system 800 implements, inter alia, the techniques presented above with the method 600 of the FIG. 6.

In an embodiment, the distributed SPM system 800 implements, inter alia, the techniques presented above with the method 700 of the FIG. 7.

In an embodiment, the distributed SPM system 800 implements, inter alia, the techniques presented above with the methods 600 of the FIG. 6 and the methods 700 of the FIG. 7.

The distributed SPM system 800 includes a distributed parallel processing environment 801, a centralized processing node 802, and the distributed processing nodes 803.

In an embodiment, the distributed parallel processing environment 801 is part of a Relational Database Management System (RDBMS).

In an embodiment, the distributed parallel processing environment 801 is part of a Map/Reduce architecture.

The centralized processing node is configured to: derive seed patterns from a sequence database, compute an execution budget for each seed pattern, iteratively distribute the seed patterns and their corresponding execution budgets to the distributed processing nodes 803 (each distributed processing node processing unique ones of the seed patterns from remaining distributed processing nodes 803), redistribute processing associated with a particular seed pattern when a particular distributed node 803 exhausts that particular distributed node's execution budget to a different one of the distributed processing nodes 803 having a remaining execution budget, and receive supper patterns derived from the sequence database in parallel as the distributed processing nodes 803 process their respective seed patterns in parallel to one another.

In an embodiment, the centralized processing node 802 is configured to compute the budget using the CSS value and sampling technique discussed above with reference to the FIGS. 1-5.

In an embodiment, the centralized processing node 802 is configured to compute each execution budget based at least in part on: lengths of the seed patterns, frequencies of the seed patterns within the sequence database, and an average length of all seed patterns for the sequence database.

In an embodiment, each distributed processing node 803 performs the Prefix Span processing discussed above with the FIGS. 1-5 to mine the super patterns from the sequence database using the provided seed patterns supplied by the centralized processing node 802 and the corresponding execution budgets.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

What is claimed is:

1. A method, comprising:
 (a) generating, by a processor, seed patterns from a sequence database;
 (b) computing, by the processor, an execution budget for processing each seed pattern based on a length for that seed pattern, wherein computing further includes computing, for each seed pattern of a given length, a Children patterns Support Sum (CSS) as a relative execution time for mining the super patterns by a given node for a given seed pattern of the given length, wherein computing further includes augmenting, each CSS, by a selective sampling value derived from: frequencies of the given seed pattern within the sequence database, the given length of the given seed pattern, and an average length for all of the seed patterns;
 (c) distributing, by the processor, a number of the seed patterns with the number of the seed patterns' execution budgets to distributed nodes that are enabled to process in parallel with one another;
 (d) load balancing, by the processor, the execution of the distributed nodes while the distributed nodes process the distributed seed patterns based on the distributed execution budgets; and
 (e) iterating, by the processor, (c)-(d) until each seed pattern is processed to identify super patterns derived from the sequence database.

2. The method of claim 1, wherein (a) further includes generating the seed patterns using a pattern growth procedure.

3. The method of claim 1, wherein (b) further includes, sorting the seed patterns based on each seed pattern's execution budget from lowest budget to highest budget.

4. The method of claim 1, wherein (c) further includes providing one of: access to the sequence database to each distributed node and distributing a copy of the sequence data to each distributed node.

5. The method of claim 1, wherein (c) further includes, ensuring that each distributed node has a single unique seed pattern or unique set of seed patterns to process relative to remaining distributed nodes.

6. The method of claim 1, wherein (c) further includes determining the number of the seed patterns to distribute to be a total number of distributed nodes available.

7. The method of claim 1, wherein (d) further includes redistributing a remaining unprocessed portion of any distributed node's seed pattern to a different one of the distributed nodes when the distributed node having the remaining unprocessed portion has exhausted that distributed node's execution budget.

8. A method, comprising:
   (a) generating, by a processor, seed patterns from a sequence database;
   (b) computing, by the processor, an execution budget for processing each seed pattern based on a length for that seed pattern;
   (c) distributing, by the processor, a number of the seed patterns with the number of the seed patterns' execution budgets to distributed nodes that are enabled to process in parallel with one another, wherein distributing further includes distributing hash keys to the distributed nodes, wherein each hash key permits each distributed node to access a distributed database table to obtain that distributed node's seed pattern and execution budget;
   (d) load balancing, by the processor, the execution of the distributed nodes while the distributed nodes process the distributed seed patterns based on the distributed execution budgets; and
   (e) iterating, by the processor, (c)-(d) until each seed pattern is processed to identify super patterns derived from the sequence database.

9. A system, comprising:
   a distributed parallel processing environment having a plurality of distributed processing nodes; and
   a centralized processing node configured to:
   i) derive seed patterns from a sequence database, ii) compute an execution budget for each seed pattern, iii) iteratively distribute the seed patterns and the seed patterns' corresponding execution budgets to the distributed processing nodes, each distributed processing node processing unique ones of the seed patterns from remaining distributed processing nodes, iv) redistribute processing associated with a particular seed pattern when a particular distributed node exhausts that particular distributed node's execution budget to a different one of the distributed processing nodes having a remaining execution budget, and v) receiving super patterns derived from the sequence database in parallel as the distributed processing nodes process their respective seed patterns in parallel to one another;
   wherein, in ii), the centralized processing node is further configured to: compute each execution budget based, at least in part, on lengths of the seed patterns, frequencies of the seed patterns within the sequence database, and an average length of all the seed patterns.

* * * * *